United States Patent
Gao et al.

(10) Patent No.: US 12,327,121 B2
(45) Date of Patent: Jun. 10, 2025

(54) INSTRUCTION SCHEDULING METHOD, INSTRUCTION SCHEDULING APPARATUS, DEVICE AND STORAGE MEDIUM BASED ON DURATIONS CONSUMED BY MEMORY ACCESS INSTRUCTIONS DURING INSTRUCTION RUNNING SCENARIOS

(71) Applicant: Beijing ESWIN Computing Technology Co., Ltd., Beijing (CN)

(72) Inventors: Fei Gao, Beijing (CN); Feng Wang, Beijing (CN); Chao Du, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 315 days.

(21) Appl. No.: 18/076,592

(22) Filed: Dec. 7, 2022

(65) Prior Publication Data
US 2023/0185574 A1 Jun. 15, 2023

(30) Foreign Application Priority Data
Dec. 10, 2021 (CN) .......................... 202111506086.1

(51) Int. Cl.
*G06F 9/38* (2018.01)
*G06F 9/30* (2018.01)

(52) U.S. Cl.
CPC ........ *G06F 9/3836* (2013.01); *G06F 9/30043* (2013.01)

(58) Field of Classification Search
CPC .. G06F 9/3836; G06F 9/30043; G06F 9/4881; G06F 11/3457
See application file for complete search history.

(56) References Cited

U.S. PATENT DOCUMENTS

| 6,092,180 A | * | 7/2000 | Anderson | G06F 9/3836 |
| | | | | 712/216 |
| 7,454,747 B2 | * | 11/2008 | Bliss | G06F 8/445 |
| | | | | 717/151 |

(Continued)

FOREIGN PATENT DOCUMENTS

WO WO-2016096053 A1 * 6/2016

OTHER PUBLICATIONS

Sam Van den Steen, Stijn Eyerman, Sander De Pestel, Moncef Mechri, Trevor E. Carlson, David Black-Schaffer, Erik Hagersten, and Lieven Eeckhout, Analytical Processor Performance and Power Modeling Using Micro-Architecture Independent characteristics, Mar. 28, IEEE, pp. 3537-3550 (Year: 2016).*

*Primary Examiner* — Courtney P Spann
(74) *Attorney, Agent, or Firm* — Ladas & Parry, LLP (57) ABSTRACT

Embodiments of the present disclosure disclose an instruction scheduling method, an electronic device and a storage medium. The method comprises: determining at least one target memory access instruction in an instruction set corresponding to a micro-architecture model; determining durations consumed by each target memory access instruction in a plurality of instruction running scenarios; and, performing instruction scheduling on each target memory access instruction on the basis of the durations consumed by each target memory access instruction in the instruction running scenarios. By using the embodiments of the present disclosure, memory access instructions can be scheduled on the basis of the durations consumed by the memory access instructions in different instruction running scenarios, so that the applicability is high.

9 Claims, 2 Drawing Sheets

(56) References Cited

U.S. PATENT DOCUMENTS

| | | | |
|---|---|---|---|
| 7,702,499 B1* | 4/2010 | Lavagno | G06F 11/3457 |
| | | | 703/27 |
| 11,114,179 B1* | 9/2021 | Ray | G06F 3/0619 |
| 2003/0204840 A1* | 10/2003 | Wu | G06F 11/3612 |
| | | | 717/160 |
| 2007/0055961 A1* | 3/2007 | Callister | G06F 8/445 |
| | | | 717/136 |
| 2008/0229028 A1* | 9/2008 | Cascaval | G06F 8/4442 |
| | | | 711/141 |
| 2013/0212334 A1* | 8/2013 | Michalak | G06F 9/38 |
| | | | 711/137 |
| 2013/0262838 A1* | 10/2013 | Al-Otoom | G06F 9/3858 |
| | | | 712/225 |
| 2015/0227369 A1* | 8/2015 | Gonion | G06F 9/3838 |
| | | | 712/7 |
| 2018/0143890 A1* | 5/2018 | Ogawa | G06F 11/3409 |
| 2022/0382546 A1* | 12/2022 | Tran | G06F 9/30038 |

\* cited by examiner

FIG. 3 ized text content # INSTRUCTION SCHEDULING METHOD, INSTRUCTION SCHEDULING APPARATUS, DEVICE AND STORAGE MEDIUM BASED ON DURATIONS CONSUMED BY MEMORY ACCESS INSTRUCTIONS DURING INSTRUCTION RUNNING SCENARIOS This application is based on and claims priority to Chinese Patent Application No. 202111506086.1, filed on Dec. 10, 2021, the entire contents of which are incorporated herein by reference.

TECHNICAL FIELD

The present disclosure relates to the field of micro-architectures, and in particular to an instruction scheduling method, a device, and a storage medium.

BACKGROUND

In the related art, a compiler usually establishes a micro-architecture model according to a hardware pipeline, instruction execution duration, bypass function, or other information, and schedules the instructions corresponding to the micro-architecture model. However, in the related art, during the instruction scheduling, the execution duration for some instructions (particularly the duration consumed by memory access instructions when accessing data) often differs from the actual duration, thereby resulting in poor instruction scheduling performance.

SUMMARY

In a first aspect, embodiments of the present disclosure provide an instruction scheduling method, comprising actions of:
  determining at least one target memory access instruction in an instruction set corresponding to a micro-architecture model;
  determining durations consumed by each target memory access instruction in a plurality of instruction running scenarios; and
  performing instruction scheduling on each target memory access instruction on the basis of the durations consumed by each target memory access instruction in the plurality of instruction running scenarios.

In a second aspect, embodiments of the present disclosure provide an electronic device, including one or more processors; and a memory configured to store one or more software modules executable by the one or more processors, wherein the one or more software modules comprise:
  an instruction determination module, configured to determine at least one target memory access instruction in an instruction set corresponding to a micro-architecture model;
  a duration determination module, configured to determine durations consumed by each target memory access instruction in a plurality of instruction running scenarios; and
  an instruction scheduling module, configured to perform instruction scheduling on each target memory access instruction on the basis of the durations consumed by each target memory access instruction in the plurality of instruction running scenarios.

In a third aspect, embodiments of the present disclosure provide a non-transitory computer-readable storage medium having computer programs stored therein that when executed by a processor, cause the processer to implement a method for instruction scheduling, the method comprising:
  determining at least one target memory access instruction in an instruction set corresponding to a micro-architecture model;
  determining durations consumed by each target memory access instruction in a plurality of instruction running scenarios; and
  performing instruction scheduling on each target memory access instruction on the basis of the durations consumed by each target memory access instruction in the plurality of instruction running scenarios.

BRIEF DESCRIPTION OF THE DRAWINGS

In order to describe the technical solutions in the embodiments of the present disclosure more clearly, the drawings to be used in the embodiments will be briefly described below. Apparently, the drawings to be used in the following description merely show some embodiments of the present disclosure. For those skilled in the art, other drawings can be obtained according to these drawings without paying any creative effort.

DETAILED DESCRIPTION

The technical solutions in the embodiments of the present disclosure will be clearly described below with reference to the drawings in the embodiments of the present disclosure. Apparently, the embodiments to be described herein are merely some but not all of the embodiments of the present disclosure. Based on the embodiments of the present disclosure, other embodiments may be obtained by those skilled in the art without paying any creative effort, which shall fall into the scope of the present disclosure.

Figure 1:
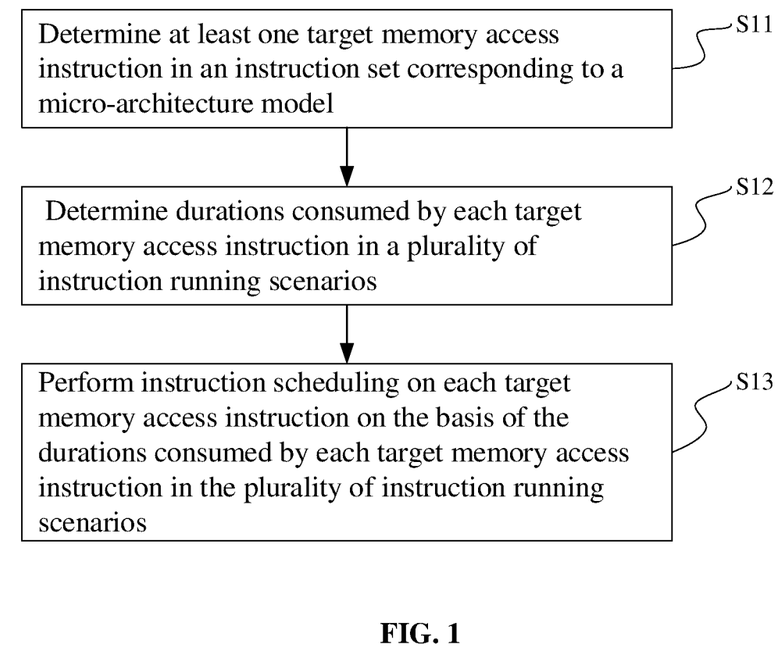
FIG. 1 is a flowchart of an instruction scheduling method according to an embodiment of the present disclosure.

With reference to FIG. 1, FIG. 1 is a flowchart of an instruction scheduling method according to an embodiment of the present disclosure. As shown in FIG. 1, the instruction scheduling method provided in this embodiment of the present disclosure may include the following actions S11 to S13.

At S11, at least one target memory access instruction in an instruction set corresponding to a micro-architecture model is determined.

In some feasible implementations, the instruction set corresponding to the micro-architecture model is a set of commands that instruct the hardware to execute an operation and/or a processing function.

The target memory access instruction is a memory access instruction with an unfixed duration for executing the corresponding operation in the instruction set.

For example, for any memory access instruction in the instruction set, if the durations consumed by this memory access instruction in different instruction running scenarios are inconsistent, the memory access instruction can be determined as a target memory access instruction in the instruction set.

For the memory access instruction, the instruction running scenario corresponding to the memory access instruction includes, but is not limited to, accessing data in the case of cache miss or accessing data in the case of cache hit. The instruction running scenario may be specifically determined according to the requirements of the actual application scenario and will not be limited herein.

Specifically, during the determination of at least one target memory access instruction from the instruction set corresponding to the micro-architecture model, the duration consumed by each memory access instruction in the instruction set in different instruction running scenarios may be determined by hardware simulation or based on actual testing of the micro-architecture model, so that the memory access instruction with different durations in different instruction running scenarios is determined as a target memory access instruction in the instruction set.

Optionally, during the determination of at least one target memory access instruction from the instruction set corresponding to the micro-architecture model, statement judgment may be performed on each instruction in the instruction set to determine loop statements (which are also referred to as first instructions hereinafter for convenience of description).

After the first instructions are determined from the instruction set, at least one target memory access instruction may be determined from the first instructions. In other words, loop statements are determined from the instruction set corresponding to the micro-architecture model, and at least one target memory access instruction is then determined from the loop statements.

Further, for each determined first instruction, loop unrolling may be performed on this first instruction, so that the first instruction is unrolled from the loop statement to a plurality of linear instructions. That is, the loop instruction is unrolled into a plurality of independent linear instructions.

Further, all memory access instructions among all linear instructions corresponding to each first instruction are determined, and the determined memory access instructions are determined as the target memory access instructions in the instruction set. That is, all loop statements in the instruction set are unrolled to obtain a plurality of independent linear instructions, and the memory access instructions in the linear instructions are determined as memory access instructions in the instruction set.

Optionally, since all linear instructions corresponding to the first instructions in the instruction set may include memory access instructions that only correspond to one instruction running scenario, such as memory access instructions that access data from a fixed storage space, the duration consumed by such memory access instructions for accessing data is a fixed duration.

On this basis, after all linear instructions corresponding to each first instruction are determined, memory access instructions with different durations consumed in different instruction running scenarios may also be determined from all linear instructions by hardware simulation or based on actual testing of the micro-architecture model, and the memory access instructions with different durations consumed in different instruction running scenarios may be determined as the target memory access instructions in the instruction set.

Optionally, after the linear instructions corresponding to all first instructions in the instruction set are determined, instructions that consume a fixed duration for executing corresponding operations (which are also referred to as second instructions hereinafter for convenience of description) may be determined firstly from all linear instructions, and at least one target memory access instruction may be then determined from other linear instructions except for the second instructions.

The second instructions in all linear instructions may be determined by hardware simulation or based on actual testing of the micro-architecture model. Since the duration consumed by other linear instructions except for the second instructions in all linear instructions when executing the corresponding operations is not fixed, memory access instructions may be determined from other linear instructions except for the second instructions, and other memory access instructions except for the second instructions may be determined as the target memory access instructions in the instruction set.

In some feasible implementations, after the target memory access instructions are determined from the loop statements (first instructions) in the instruction set, the non-loop statements in the instruction set may also include memory access instructions with different durations consumed in different instruction running scenarios.

On this basis, after the target memory access instructions in the loop statements in the instruction set are determined, other memory access instructions except for the first instructions (loop statements) in the instruction set may be determined. Further, target memory access instructions with different durations consumed in different instruction running scenarios are determined from other memory access instructions. For example, target memory access instructions with different durations consumed in different instruction running scenarios are determined from non-loop statements in the instruction set by hardware simulation or based on actual testing of the micro-architecture model.

Optionally, the memory access instructions in the non-loop statements may also be directly determined as target memory access instructions in the instruction set.

At S12, durations consumed by each target memory access instruction in a plurality of instruction running scenarios are determined.

In some feasible implementations, after the target memory access instructions in the instruction set are determined, the durations consumed by each target memory access instruction in different instruction running scenarios may be determined. For example, for each target memory access instruction, the duration consumed by this target memory access instruction in accessing data in the case of cache miss and the duration consumed by this target memory access instruction in accessing data in the case of cache hit may be determined.

If all memory access instructions in the instruction set are determined as target memory access instructions, the durations consumed by each memory access instruction in different instruction running scenarios may be determined by hardware simulation or based on actual testing of the micro-architecture model after the target memory access instructions are determined.

If, during the determination of the target memory access instructions, the first instructions (loop statements) in the instruction set are unrolled firstly and the memory access instructions in the linear instructions obtained after unrolling the first instructions are then determined as the target memory access instructions, after the target memory access instructions are determined, the duration consumed by each memory access instruction in different instruction running scenarios is determined by hardware simulation or based on actual testing of the micro-architecture model.

If the duration consumed by the memory access instructions in the instruction set in different instruction running scenarios is determined firstly by hardware simulation or based on actual testing of the micro-architecture model and the memory access instructions with different durations consumed in different instruction running scenarios are then determined as target memory access instructions in the instruction set, the durations consumed by the target memory access instructions in different instruction running scenarios may be directly obtained.

At S13, instruction scheduling is performed on each target memory access instruction on the basis of the duration consumed by each target memory access instruction in the plurality of instruction running scenarios.

In some feasible implementations, after the durations consumed by the target memory access instructions in the instruction set in a plurality of instruction running scenarios are determined, each target memory access instruction may be scheduled on the basis of the durations consumed by each target memory access instruction in the plurality of instruction running scenarios.

Specifically, for each target memory access instruction, the scheduling priority of this target memory access instruction in different instruction running scenarios may be determined on the basis of the durations consumed by this target memory access instruction in the plurality of instruction running scenarios.

For example, it may be determined that the scheduling priority of this target memory access instruction for accessing data in the case of cache hit is higher than that of this target memory access instruction for accessing data in the case of cache miss. Thus, during the scheduling of this target memory access instruction, this target memory access instruction is preferentially scheduled in the case of cache hit.

Optionally, the running order of the target memory access instructions may be rearranged on the basis of the hardware pipeline and bypass information of the micro-architecture model, the durations consumed by each target memory access instruction in different instruction running scenarios or the like, so that relatively more target memory access instructions can be run within a relatively less time.

Optionally, the loop statements in the instruction set may be replaced with linear instructions, and the target memory access instructions in the linear instructions and/or target memory access instructions in other statements except for the loop statements in the instruction set are rescheduled on the basis of the hardware pipeline and bypass information of the micro-architecture model, the durations consumed by each target memory access instruction in different instruction running scenarios or the like, to run relatively more memory access instructions within a relatively less time, and to reduce the duration errors caused by different durations consumed by each target memory access instruction in different instruction running scenarios during the statement loop process at the same time, so that the instruction scheduling performance is improved.

In some feasible implementations, besides the determination of the target memory access instructions in the instruction set on the basis of any one of the above feasible implementations, the duration consumed by other instructions (which are referred to as third instructions hereinafter for convenience of description) except for the target memory access instructions in the instruction set when executing the corresponding operations may also be determined.

The third instruction in the instruction set may include instructions with a fixed duration consumed when executing the corresponding operations, or may include instructions with different durations consumed in different instruction running scenarios. This may be specifically determined according to the requirements of the actual application scenario and will not be limited herein.

In other words, for each instruction (including target memory access instructions) in the instruction set, if there are a plurality of instruction running scenarios for this instruction, the duration consumed by this instruction in each instruction running scenario is determined; and, if there is only one instruction running scenario for this instruction, that is, if the duration consumed by this instruction when executing the corresponding operation is a fixed duration, the fixed duration corresponding to this instruction may be determined.

Further, instruction scheduling is performed on each target memory access instruction and each third instruction on the basis of the duration consumed by each target memory access instruction in each instruction running scenario and the duration consumed by each third instruction when executing the corresponding operation. That is, all instructions in the instruction set are scheduled on the basis of the duration consumed by each instruction in the instruction set in each instruction running scenario.

Specifically, for the third instructions and the target memory access instructions, the scheduling priorities of the third instructions and the target memory access instructions may be determined on the basis of the duration consumed by the third instructions when executing the corresponding operations and the duration consumed by each target memory access instruction in each instruction running scenario.

For example, for any target memory access instruction, it may be determined that the scheduling priority of this target memory access instruction for accessing data in the case of cache hit is higher than the scheduling priority of a certain third instruction and the scheduling priority of this target memory access instruction for accessing data in the case of cache miss is lower than the scheduling priority of this third instruction. Thus, during the scheduling of this target memory access instruction and this third instruction, this target memory access instruction is preferentially scheduled in the case of cache hit.

Optionally, the running order of each target memory access instruction and each third instruction may be rearranged on the basis of the hardware pipeline, bypass information or the like of the micro-architecture model, the durations consumed by each target memory access instruction in different instruction running scenarios, the duration consumed by each third instruction when executing the corresponding operation or the like, so that relatively more target memory access instructions can be run within a relatively less time.

Optionally, the loop statements in the instruction set may be replaced with linear instructions, and the target memory instructions and third instructions in the linear instructions may be rescheduled on the basis of the hardware pipeline and bypass information of the micro-architecture model, the duration consumed by each third instruction when executing the corresponding operation, the durations consumed by each target memory access instruction in different instruction running scenarios or the like, to run relatively more instructions within a relatively less time and improve the instruction scheduling performance.

For example, for the micro-architecture model, the execution order of each instruction corresponding to the micro-architecture model may be adjusted on the basis of the durations consumed by each target memory access instruction in the instruction set corresponding to the micro-architecture model in different instruction running scenarios and the duration consumed by each third instruction in the instruction set when executing the corresponding operation. For example, the target memory access instructions and/or third instructions with a short duration are arranged in relatively concentrated positions without affecting the performance of the micro-architecture model, so that the micro-architecture model may run more instructions per unit of time.

In some feasible implementations, the data cached in the cache corresponding to the micro-architecture model may be determined in real-time, and a first memory access instruction corresponding to the data in the cache may be then determined. That is, the first memory access instruction may access data in the case of cache hit.

Further, the target memory access instructions determined from the instruction set are differentiated into a first memory access instruction and a second memory access instruction, and each target memory access instruction and each third instruction are scheduled on the basis of the duration consumed by the first memory access instruction for accessing data in the case of cache hit, the duration consumed by the second memory access instruction for accessing data in the case of cache miss and the duration consumed by the third instruction when executing the corresponding operation, so that the scheduling of each target memory access instruction and each third instruction satisfies the actual operation requirements of the micro-architecture model better and the applicability is high.

In embodiments of the present disclosure, by determining the duration consumed by the target memory access instructions in the instruction set in each instruction running scenario, the consumption time of the target memory access instructions can be modeled more accurately during the scheduling of instructions in the instruction set, thereby achieving the better instruction scheduling effect.

Figure 2:
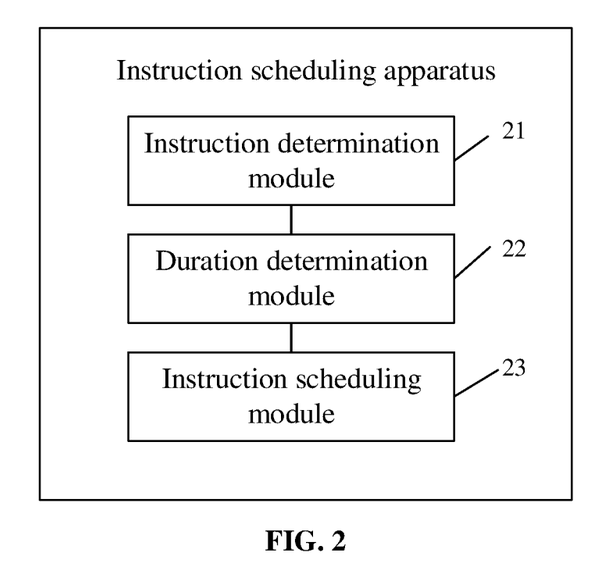
FIG. 2 is a schematic structure diagram of an instruction scheduling apparatus according to an embodiment of the present disclosure.

With reference to FIG. 2, FIG. 2 is a schematic structure diagram of an instruction scheduling apparatus according to an embodiment of the present disclosure. The instruction scheduling apparatus provided in this embodiment of the present disclosure includes an instruction determination module 21, a duration determination module 22, and an instruction scheduling module 23. In some embodiments, modules 21, 22, and 23 may be software modules.

The instruction determination module 21 is configured to determine at least one target memory access instruction in an instruction set corresponding to a micro-architecture model.

The duration determination module 22 is configured to determine the duration consumed by each target memory access instruction in a plurality of instruction running scenarios.

The instruction scheduling module 23 is configured to perform instruction scheduling on each target memory access instruction on the basis of the duration consumed by each target memory access instruction in the plurality of instruction running scenarios.

In some feasible implementations, the instruction running scenarios include accessing data in the case of cache miss and accessing data in the case of cache hit.

In some feasible implementations, during the determination of at least one target memory access instruction in the instruction set corresponding to the micro-architecture model, the instruction determination module 21 is configured to:
perform statement judgment on each instruction in the instruction set corresponding to the micro-architecture model, and determine first instructions in the instruction set, the first instructions being loop statements; and
determine at least one target memory access instruction from the first instructions.

In some feasible implementations, during the determination of at least one target memory access instruction from the first instructions, the instruction determination module 21 is configured to:
perform loop unrolling on the first instructions to obtain a plurality of linear instructions corresponding to the first instructions; and
determine at least one target memory access instruction from the linear instructions.

In some feasible implementations, during the determination of at least one target memory access instruction from the linear instructions, the instruction determination module 21 is configured to:
determine second instructions that consume a fixed duration for executing corresponding operations among the linear instructions; and
determine at least one target memory access instruction from other linear instructions except for the second instructions.

In some feasible implementations, the instruction determination module 21 is further configured to:
determine at least one target memory access instruction from other instructions except for the first instructions in the instruction set.

In some feasible implementations, the instruction scheduling module 23 is further configured to:
determine the duration consumed by third instructions except for the target memory access instructions in the instruction set when executing the corresponding operations; and
perform instruction scheduling on each target memory access instruction and each third instruction on the basis of the duration consumed by each target memory access instruction in each instruction running scenario and the duration consumed by each third instruction when executing the corresponding operation.

During specific implementations, the instruction scheduling apparatus may execute the implementations provided by the actions in FIG. 1 through various functional modules built in the instruction scheduling apparatus, and the details may be found in the implementations provided by the above actions and will not be repeated here.

Figure 3:
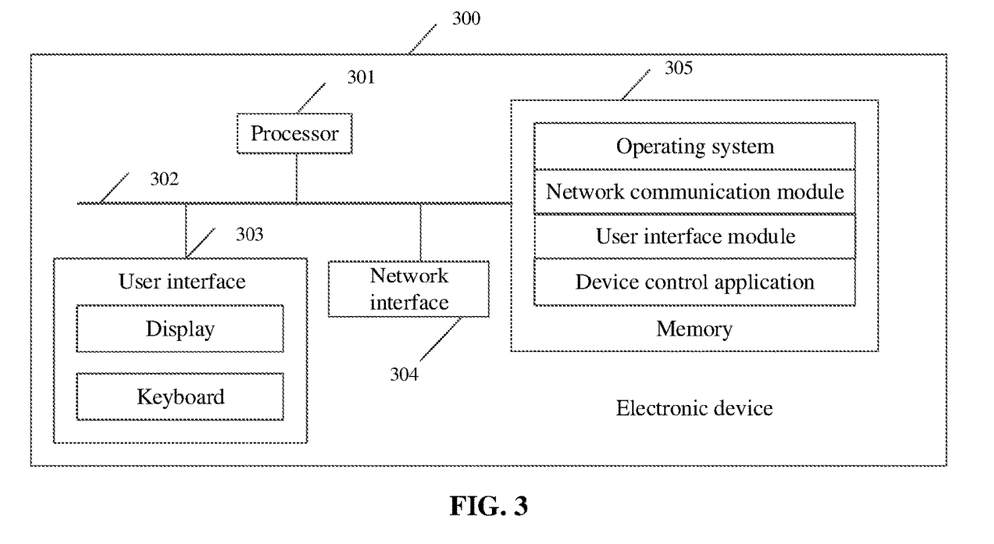
FIG. 3 is a schematic structure diagram of an electronic device according to an embodiment of the present disclosure.

With reference to FIG. 3, FIG. 3 is a schematic structure diagram of an electronic device according to an embodiment of the present disclosure. As shown in FIG. 3, the electronic device 300 in this embodiment may include: a preprocessor 301, a network interface 304, and a memory 305. In addition, the electronic device 300 may include: a user interface 303 and at least one communication bus 302. The communication bus 302 is configured to realize the connection communication among these components. The user interface 303 may include a display and a keyboard. Optionally, the user interface 303 may further include standard wired interfaces and wireless interfaces. Optionally, the network face 304 may include standard wired interfaces or wireless interfaces (e.g., WI-FI interfaces). The memory 304 may include high-speed RAM memories, or may include non-volatile memories (NVMs), for example, at least one magnetic disk memory. Optionally, the memory 305 may also be at least one storage device located away from the processor 301. As shown in FIG. 3, as a computer-readable storage medium, the memory 305 may include an operating system, a network communication module, a user interface module, and a device control disclosure.

In the electronic device 300 shown in FIG. 3, the network interface 304 may provide a network communication function; the user interface 303 is mainly configured to provide an input interface for the user; and, the processor 301 may be configured to call the device control application stored in the memory 305 to implement the following:

determine at least one target memory access instruction in an instruction set corresponding to a micro-architecture model;

determine the durations consumed by each target memory access instruction in a plurality of instruction running scenarios; and perform instruction scheduling on each target memory access instruction on the basis of the durations consumed by each target memory access instruction in the plurality of instruction running scenarios.

In some feasible implementations, the instruction running scenarios include accessing data in the case of cache miss and accessing data in the case of cache hit.

In some feasible implementations, during the determination of at least one target memory access instruction in the instruction set corresponding to the micro-architecture model, the processor 301 is configured to:

perform statement judgment on each instruction in the instruction set corresponding to the micro-architecture model, and determine the first instructions in the instruction set, the first instructions being loop statements; and determine at least one target memory access instruction from the first instructions.

In some feasible implementations, during the determination of at least one target memory access instruction from the first instructions, the processor 301 is configured to:

perform loop unrolling on the first instructions to obtain a plurality of linear instructions corresponding to the first instructions; and determine at least one target memory access instruction from the linear instructions.

In some feasible implementations, during the determination of at least one target memory access instruction from the linear instructions, the processor 301 is configured to:

determine second instructions that consume a fixed duration for executing corresponding operations among the linear instructions; and determine at least one target memory access instruction from other linear instructions except for the second instructions.

In some feasible implementations, the processor 301 is further configured to:

determine at least one target memory access instruction from other instructions except for the first instructions in the instruction set.

In some feasible implementations, the processor 301 is further configured to:

determine the duration consumed by third instructions except for the target memory access instructions in the instruction set when executing the corresponding operations; and perform instruction scheduling on each target memory access instruction and each third instruction on the basis of the duration consumed by each target memory access instruction in each instruction running scenario and the duration consumed by each third instruction when executing the corresponding operation.

In some embodiments, the electronic device may include one or more processors; and a memory configured to store one or more software modules executable by the one or more processors. Wherein the one or more software modules may include modules 21, 22, and 23 of the instruction scheduling apparatus according to embodiments of the present disclosure as described above with reference to FIG. 2. Details of which can be found in the above descriptions and thus will not be repeated here.

It should be understood that, in some feasible implementations, the processor 301 may be a central processing unit (CPU), and the processor may also be other general-purpose processors, digital signal processors (DSPs), application specific integrated circuits (ASICs), field-programmable gate arrays (FPGAs) or other programmable logic devices, discrete gate or transistor logic devices, discrete hardware components, etc. The general-purpose processors may be microprocessors, or the processor may also be any conventional processor, etc. The memory may include ROMs and RAMs, and provides instructions and data to the processor. A part of the memory may further include non-volatile RAMs. For example, the memory may also store information of the device type.

During specific implementations, the electronic device 300 may execute the implementations provided by the actions in FIG. 1 through various functional modules built in the electronic device, and the details may refer to the implementations provided by the above actions and will not be repeated here.

An embodiment of the present disclosure further provides a computer-readable storage medium having computer programs stored therein that when executed by a processor, cause the processor to implement the method provided by the actions in FIG. 1. The details may be found in the implementations provided by the above actions and will not be repeated here. The computer-readable storage medium may be a non-transitory computer-readable storage medium.

The computer-readable storage medium may be an internal storage unit of the instruction scheduling apparatus or an electronic device provided in any one of the above embodiments, for example, a hard disk or memory of the electronic device. The computer-readable storage medium may also be an external storage device of the electronic device, for example, a plug-in type hard disk, a smart medium card (SMC), a secure digital (SD) card, a flash card, etc. equipped on the electronic device. The computer-readable storage medium may further include magnetic disks, optical disks, ROMs, RAMs, etc. Further, the computer-readable storage medium may further include the internal storage unit of the electronic device and the external storage device. The computer-readable storage medium is configured to store the computer programs and other programs and data required for the electronic device. The computer-readable storage medium may be further configured to temporarily store the data that has been output or is to be output.

An embodiment of the present disclosure provides a computer program product including computer programs or computer instructions. When the computer programs or computer instructions are executed by a processor, the processor is caused to perform the instruction scheduling method provided in the embodiments of the present disclosure, for example, the method described with reference to the actions in FIG. 1.

The terms such as "first" and "second" in the specification and claims of the present disclosure and the accompanying drawings are used for distinguishing similar objects, rather than describing a specific order. In addition, the terms "include" and "having" and any variants thereof are intended to cover non-exclusive inclusions. For example, a process, method, system, product or electronic device containing a series of steps or units is not limited to the listed steps or units, and may optionally include steps or units that are not listed, or may optionally include other steps or units inherent to the process, method, product or electronic device. The reference to "an embodiment" herein means that the specific features, structures or characteristics described with reference to the embodiment may be included in at least one embodiment of the present application. The exhibition of this phase in various places of the specification neither necessarily means the same embodiment nor independent or alternative embodiments that are mutually exclusive with other embodiments. It should be explicitly and implicitly understood by those skilled in the art that the embodiments described herein can be combined with other embodiments. The term "and/or" used in the specification and claims of the present application refers to any combination and all possible embodiments of one or more of the associated listed items, and includes these combinations.

It should be recognized by one person of ordinary skill in the art that, the units and algorithm steps in the examples described in the embodiments disclosed herein can be implemented by electronic hardware, computer software or combinations thereof. To clearly explain the interchangeability of hardware and software, the components and stores in each example have been generally described in terms of function in the foregoing description. Those skilled in the art can implement the described functions by applying different methods to each specific application, but this implementation should not be deemed as going beyond the scope of the present application.

The above disclosure merely shows the embodiments of the present application and is not intended to limit the patent scope of the present application. Therefore, the equivalent alterations made according to the claims of the present application shall fall into the scope of the present application.

What is claimed is:

1. An instruction scheduling method, comprising steps of:
   determining at least one target memory access instruction in an instruction set corresponding to a micro-architecture model;
   determining a duration consumed by each target memory access instruction in a plurality of instruction running scenarios; and
   performing instruction scheduling on each target memory access instruction on the basis of the duration consumed by each target memory access instruction in the plurality of instruction running scenarios,
   wherein the determining at least one target memory access instruction in the instruction set corresponding to the micro-architecture model comprises: performing statement judgment on each instruction in the instruction set corresponding to the micro-architecture model, and determining first instructions in the instruction set, the first instructions being loop statements; and determining at least one target memory access instruction from the first instructions; and
   wherein the determining at least one target memory access instruction from the first instructions comprises: performing loop unrolling on the first instructions to obtain a plurality of linear instructions corresponding to the first instructions; and determining at least one target memory access instruction from the linear instructions; and
   wherein the determining at least one target memory access instruction from the linear instructions comprises: determining second instructions that consume a fixed duration for executing corresponding operations among the linear instructions; and determining at least one target memory access instruction from other linear instructions except for the second instructions.

2. The method according to claim 1, wherein the instruction running scenarios comprise accessing data in a case of cache miss and accessing data in a case of cache hit.

3. The method according to claim 1, further comprising:
   determining at least one target memory access instruction from other instructions except for the first instructions in the instruction set.

4. The method according to claim 1, further comprising:
   determining a duration consumed by third instructions when executing corresponding operations except for the target memory access instructions in the instruction set; and
   performing instruction scheduling on each target memory access instruction and each third instruction on the basis of the duration consumed by each target memory access instruction in each instruction running scenario and the duration consumed by each third instruction when executing the corresponding operations.

5. An electronic device, comprising:
   one or more processors; and
   a memory, configured to store one or more software instructions executable by the one or more processors, when the one or more software instructions are executed by the one or more processors, cause the one or more processors to:
   determine at least one target memory access instruction in an instruction set corresponding to a micro-architecture model;
   determine durations consumed by each target memory access instruction in a plurality of instruction running scenarios; and
   perform instruction scheduling on each target memory access instruction on the basis of the durations consumed by each target memory access instruction in the plurality of instruction running scenarios,
   wherein determine at least one target memory access instruction in the instruction set corresponding to the micro-architecture model comprises: perform statement judgment on each instruction in the instruction set corresponding to the micro-architecture model, and determine first instructions in the instruction set, the first instructions being loop statements; and determine at least one target memory access instruction from the first instructions; and
   wherein determine at least one target memory access instruction from the first instructions comprises: performing loop unrolling on the first instructions to obtain a plurality of linear instructions corresponding to the first instructions; and determining at least one target memory access instruction from the linear instructions; and
   wherein determine at least one target memory access instruction from the linear instructions comprises: determining second instructions that consume a fixed duration for executing corresponding operations among the linear instructions; and determining at least one target memory access instruction from other linear instructions except for the second instructions.

6. The electronic device according to claim 5, wherein the instruction running scenarios comprise accessing data in a case of cache miss and accessing data in a case of cache hit.

7. The electronic device according to claim 5 wherein when the one or more software instructions are executed by the one or more processors, cause the one or more processors further to:
determine at least one target memory access instruction from other instructions except for the first instructions in the instruction set.

8. The electronic device according to claim 5, wherein when the one or more software instructions are executed by the one or more processors, cause the one or more processors further to:
determine a duration consumed by third instructions when executing corresponding operations except for the target memory access instructions in the instruction set; and
perform instruction scheduling on each target memory access instruction and each third instruction on the basis of the duration consumed by each target memory access instruction in each instruction running scenario and the duration consumed by each third instruction when executing the corresponding operations.

9. A non-transitory computer-readable storage medium having computer programs stored therein that when executed by a processor, cause the processer to implement a method for instruction scheduling, the method comprising:
determining at least one target memory access instruction in an instruction set corresponding to a micro-architecture model;
determining durations consumed by each target memory access instruction in a plurality of instruction running scenarios; and
performing instruction scheduling on each target memory access instruction on the basis of the durations consumed by each target memory access instruction in the plurality of instruction running scenarios;
wherein the determining at least one target memory access instruction in the instruction set corresponding to the micro-architecture model comprises: performing statement judgment on each instruction in the instruction set corresponding to the micro-architecture model, and determining first instructions in the instruction set, the first instructions being loop statements; and determining at least one target memory access instruction from the first instructions; and
wherein the determining at least one target memory access instruction from the first instructions comprises: performing loop unrolling on the first instructions to obtain a plurality of linear instructions corresponding to the first instructions; and determining at least one target memory access instruction from the linear instructions; and
wherein the determining at least one target memory access instruction from the linear instructions comprises: determining second instructions that consume a fixed duration for executing corresponding operations among the linear instructions; and determining at least one target memory access instruction from other linear instructions except for the second instructions.

* * * * *